US012209425B2

(12) United States Patent
Chen et al.

(10) Patent No.: US 12,209,425 B2
(45) Date of Patent: Jan. 28, 2025

(54) METHOD FOR ENTIRE REMOVAL OF SPACE TRUSS AND ASSISTIVE SUPPORT MECHANISM

(71) Applicant: CHINA CONSTRUCTION SCIENCE AND INDUSTRY CORPORATION LTD., Guangdong (CN)

(72) Inventors: Zhenming Chen, Guangdong (CN); Sumei Zhang, Guangdong (CN); Xuefeng Liu, Guangdong (CN); Zhan Wang, Guangdong (CN); Yongqing Zhao, Guangdong (CN); Shitao Huang, Guangdong (CN)

(73) Assignee: CHINA CONSTRUCTION SCIENCE AND INDUSTRY CORPORATION LTD., Guangdong (CN)

( * ) Notice: Subject to any disclaimer, the term of this patent is extended or adjusted under 35 U.S.C. 154(b) by 425 days.

(21) Appl. No.: 17/609,040

(22) PCT Filed: Aug. 28, 2020

(86) PCT No.: PCT/CN2020/112175
§ 371 (c)(1),
(2) Date: Nov. 5, 2021

(87) PCT Pub. No.: WO2021/120687
PCT Pub. Date: Jun. 24, 2021

(65) Prior Publication Data

US 2022/0213705 A1 Jul. 7, 2022

(30) Foreign Application Priority Data

Dec. 19, 2019 (CN) ........................ 201911320548.3
Dec. 26, 2019 (CN) ........................ 201911365200.6

(51) Int. Cl.
*E04G 23/08* (2006.01)
*B66F 7/10* (2006.01)

(52) U.S. Cl.
CPC ................ *E04G 23/08* (2013.01); *B66F 7/10* (2013.01)

(58) Field of Classification Search
CPC ............ E04G 23/08; B66F 7/10; E01D 22/00
See application file for complete search history.

(56) References Cited

U.S. PATENT DOCUMENTS 8,387,941 B2 * 3/2013 Qin ......................... E01D 21/00 249/1
8,621,697 B2 * 1/2014 Bruckner ................ E01D 22/00 414/12

(Continued)

FOREIGN PATENT DOCUMENTS

CN 110093869 A * 8/2019 ............. E01D 22/00

*Primary Examiner* — Stephen A Vu
(74) *Attorney, Agent, or Firm* — Miles & Stockbridge PC; Ajay A. Jagtiani

(57) ABSTRACT

This invention relates to a method for entire removal of a space truss, and an assistive support mechanism therefor. The assistive support mechanism is arranged on a vertical support rod of a truss structure, the assistive support mechanism comprises an assistive support assembly, a lattice support member, and a conversion platform. The lifting assembly is arranged at a top of the conversion platform and comprises a stranded wire, a lifting member, and a control member. The method for entire removal of a space truss comprises mounting the assistive support mechanism, and performing initial removal of the truss structure; lowering the truss structure; and then performing secondary removal of the entire space truss. The major removal work is done on the ground, thereby reducing the requirement for removal-assisting measures and the operational risks, and improving the working efficiency.

9 Claims, 4 Drawing Sheets

(56) References Cited

U.S. PATENT DOCUMENTS

| | | | | |
|---|---|---|---|---|
| 8,671,490 | B1 * | 3/2014 | Carney | E01D 22/00<br>14/2.4 |
| 8,869,336 | B2 * | 10/2014 | Meyer | E01D 21/10<br>414/10 |
| 2013/0081215 | A1 * | 4/2013 | Capolupo | E01D 21/00<br>414/10 |
| 2014/0026335 | A1 * | 1/2014 | Smith | E01D 19/02<br>105/379 |

* cited by examiner

METHOD FOR ENTIRE REMOVAL OF SPACE TRUSS AND ASSISTIVE SUPPORT MECHANISM

CROSS-REFERENCE TO RELATED APPLICATIONS

This application is a National Stage of International Application No. PCT/CN2020/112175 filed on Aug. 28, 2020, which is hereby incorporated by reference in its entirety.

TECHNICAL FIELD

The present invention relates to the technical field of building construction, and particularly relates to a method for entire removal of space truss and an assistive support mechanism therefor.

BACKGROUND

With the development of the building industry, more and more buildings use truss structures in the air for supporting, the form of truss structure has reasonable force-bearing characteristics, high rigidity, and light weight, and is convenient to manufacture and mount. The truss structure has upper chord members and lower chord members that are both continuously arranged, the chord members directly intersect and are connected to web members, so that it is easy for the roof to form multiple curvatures, which is widely applied in public and industrial buildings with large span and large pillars.

At the same time of increasingly wide utilization of truss structures, the removal of truss structures also gradually catches people's attention. As for the removal of truss structures, the removal schemes presently used usually include: removal by divided span demounting, whole removal by using multiple cranes to lift the truss arch, manual removal by using hanging baskets, hanging removal by crane hoisting, etc. However, for a truss structure with large span or super-large span, the internal forces and displacements of the components and members undergo continuous change during every stage, therefore, it is required to track and calculate the internal forces and displacements at every stage in order to determine whether the components and members meet the requirements of strength, rigidity and stability, and find the most dangerous stage in the operation process to perform precise control, so that it is possible to ensure the safety of the structural operation.

In the prior art, a high-altitude removal method is generally adopted for construction, which needs a full-scaffold structure to be built, wherein the full-scaffold structure to be built has a large area and a great height, requiring a very large amount of construction measures, this leads to high cost of removal, and the difficulty level for controlling the stability of the truss structure during the construction process is high, the force-bearing conditions during the removal process is not clear enough, and thus the safety is difficulty to ensure.

SUMMARY OF THE INVENTION

An objective of the present invention is to provide a method for entire removal of space truss and an assistive support mechanism therefor, in order to solve the technical problem in the prior art that the construction difficulty is high and it is difficult to ensure the safety for removal of a truss structure with large span or super-large span.

In order to achieve the above objective, the technical solution adopted by the present invention provides an assistive support mechanism, arranged on a vertical support rod of a truss structure, wherein, the assistive support mechanism comprises an assistive support assembly having a support platform, a lattice support member arranged on the support platform, and a conversion platform arranged at a top of the lattice support member; and a lifting assembly, arranged at a top of the conversion platform and comprising a stranded wire for fixing the truss structure, a lifting member for driving the stranded wire to move up and down, and a control member for controlling the lifting member.

Furthermore, at least two lifting members and at least two stranded wires are provided, and the lifting members and the stranded wires are respectively arranged on both sides of the top of the conversion platform.

Furthermore, the assistive support assembly further comprises at least two first oblique brace struts, with one end of each first oblique brace strut fixed on the vertical support rod, and the other end of each first oblique brace strut fixed on a bottom of the support platform.

Furthermore, a conversion seat beam having a frame shape is further arranged between the support platform and the lattice support member.

Furthermore, the assistive support assembly further comprises at least two second oblique brace struts, with one end of each second oblique brace strut fixed on the lattice support member, and the other end of each second oblique brace strut fixed on a bottom of the conversion platform.

Furthermore, a fastening platen is fixed at a bottom of the lifting member.

The present invention also discloses a method for entire removal of a space truss, comprising the following steps:

- mounting the afore-mentioned assistive support mechanism on a vertical support rod of each of a plurality of truss structures, wherein the stranded wire is in fixed connection with a corresponding truss structure;
- cutting off connection rods of the truss structure surrounding the vertical support rod, separating the truss structure from the vertical support rod, and lowering the truss structure to the ground by the lifting assembly;
- removing the truss structure and the assistive support mechanism on the ground.

Furthermore, the stranded wire is fixedly connected to a lower chord member of the truss structure.

Furthermore, before mounting the assistive support mechanism, the method further comprises the following step: performing construction simulation calculation on the truss structure prior to removal.

Furthermore, the truss structure is removed by sequentially removing an upper chord member, a middle web member, a welding ball of the upper chord member, a lower chord member and a welding ball of the lower chord member.

The beneficial effects of the method for entire removal of a space truss and the assistive support mechanism provided by the present invention include: in contrast to the prior art, by means of the method for entire removal of a space truss and the assistive support mechanism of the present invention, the assistive support mechanism is directly arranged on an original vertical support member, which is obtainable by retrofitting an original structure, the support platform can support the lattice support member, the lattice support member can raise the height of the entire mechanism, the conversion platform is used to support the lifting assembly, the stranded wire fixes the truss structure, and then, initial removal of the truss structure can be performed at a high altitude to separate the truss structure from the vertical support rod, the lifting member can drive the stranded wire to move up and down so as to steadily lower the entire truss structure to the ground, while the control member can control the lifting member, and after the truss structure is lowered to the ground, secondary removal is performed on the entire body thereof, hence, the major removal work is done on the ground, thereby reducing the requirement for removal-assisting measures, improving the working efficiency and reducing the operational risks.

BRIEF DESCRIPTION OF THE DRAWINGS

In order to describe the technical solutions more clearly in the specific embodiments of the present invention or in the prior art, hereinafter, the appended drawings used for describing the specific embodiments or the prior art will be briefly introduced. Apparently, the drawings described below show only some embodiments of the present invention, and for a person skilled in the art, without expenditure of creative labor, other drawings can be derived based on these appended drawings.

REFERENCE SIGNS

1-truss structure; 2-assistive support assembly; 3-lifting assembly; 11-vertical support rod; 12-upper chord member; 13-middle web member; 14-lower chord member; 21-support platform; 22-lattice support member; 23-conversion platform; 24-first oblique brace strut; 25-conversion seat beam; 26-second oblique brace strut; 31-stranded wire; 32-lifting member; 33-fastening platen.

DETAILED DESCRIPTION OF EMBODIMENTS

A clear and complete description of the technical solutions of the present invention is given below, in conjunction with the appended drawings. Apparently, the described embodiments are a part, but not all, of the embodiments of the present invention. All the other embodiments, derived by a person skilled in the art based on the embodiments described in the present invention without expenditure of creative labor, are included in the protection scope of the present invention.

In the description of the present invention, it needs to be noted that, terms such as "center", "above", "below", "left", "right", "vertical", "horizontal", "inside", "outside" refer to the orientation or positional relation based on the illustration of the drawings, which is merely for facilitating and simplifying the description of the present invention, not for indicating or implying that the described apparatus or component must have a particular orientation or must be configured or operated in a particular orientation, therefore is not to be construed as a limitation towards the present invention. In addition, terms such as "first", "second", "third" are merely for the purpose of description, and are not to be construed as an indication or implication of relative importance thereof.

In the description of the present invention, it needs to be noted that, unless specifically defined or restricted otherwise, terms such as "mount", "interconnect", "connect" should be broadly construed, for example, they may be fixed connection or detachable connection or integral connection; they may be mechanical connection or electrical connection; they may be direct connection, or indirect connection via an intermediate medium, or internal communication between two units. For a person skilled in the art, the specific meaning of the afore-mentioned terms in the present invention can be understood according to specific situations thereof.

Furthermore, the technical features involved in different embodiments of the present invention described below can be combined with one another as long as they do not conflict with one another.

Figure 1:
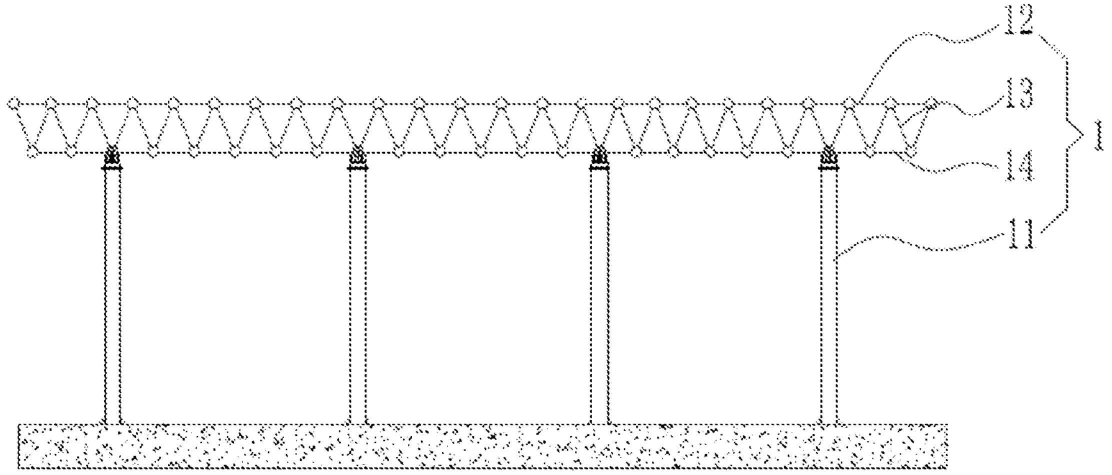
FIG. 1 is a structural schematic diagram of a truss structure provided in the embodiments of the present invention.
Figure 2:
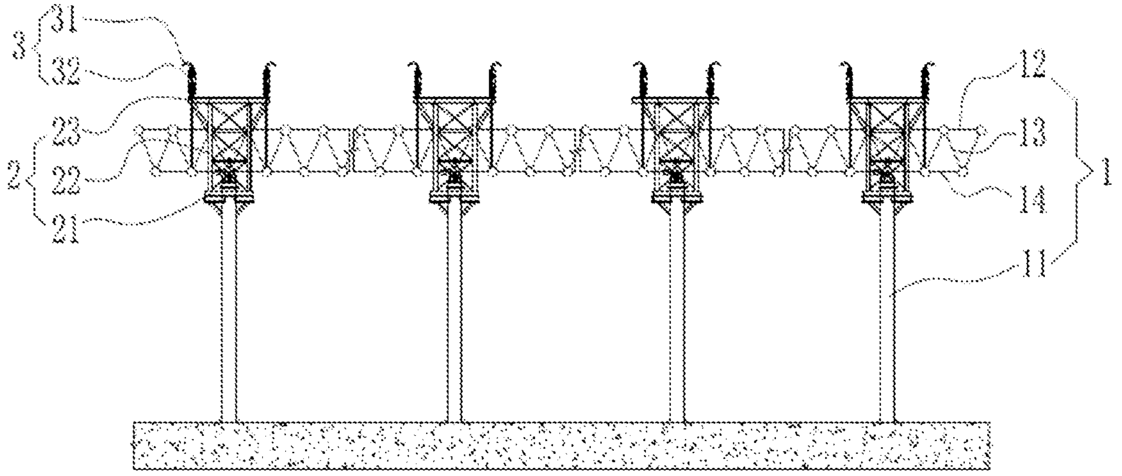
FIG. 2 is a structural schematic diagram of the step S2 of the method for entire removal of a space truss provided in the embodiments of the present invention.

Referring to FIG. 1 and FIG. 2, an assistive support mechanism provided in the present invention is now described. The assistive support mechanism is arranged on a vertical support rod 11 of a truss structure 1 and comprises an assistive support assembly 2 and a lifting assembly 3, wherein the assistive support assembly 2 comprises a support platform 21, a lattice support member 22 arranged on the support platform 21, and a conversion platform 23 arranged at a top of the lattice support member 22; and the lifting assembly 3 is arranged at a top of the conversion platform 23 and comprises a stranded wire 31 for fixing the truss structure 1, a lifting member 32 for driving the stranded wire 31 to move up and down, and a control member (not shown) for controlling the lifting member 32.

With respect to the assistive support mechanism provided in the present invention, in contrast to the prior art, the assistive support mechanism is directly arranged on an original vertical support rod 11, which is obtainable by retrofitting an original structure, the support platform 21 can support the lattice support member 22, the lattice support member 22 can raise the height of the entire mechanism, the conversion platform 23 is used to support the lifting assembly 3, the stranded wire 31 fixes the truss structure 1, and then, initial removal of the truss structure 1 can be performed at a high altitude to separate the truss structure 1 from the vertical support rod 11, the lifting member 32 can drive the stranded wire 31 to move up and down so as to steadily lower the entire truss structure 1 to the ground, while the control member can control the lifting member 32, and after the truss structure 1 is lowered to the ground, secondary removal is performed on the entire body thereof, hence, the major removal work is done on the ground, thereby reducing the requirement for removal-assisting measures, improving the working efficiency and reducing the operational risks.

Specifically, the support platform 21 is directly laid transversely at a top of a vertical support rod 11 of the original truss structure 1, so as to support the lattice support member 22 thereon. The lattice support member 22 refers to a lattice formed by joining multiple struts, and the lattice support member 22 has relatively high support strength and stability, and can stably ensure the operation of moving the truss structure 1 up and down by the lifting assembly 3. Wherein, the height of upper wing plates of the conversion platform 23 needs to exceed that of the surface of the truss structure 1 by two to four meters, so that hoisting of the truss structure 1 can be performed from an upper side towards a lower side.

Figure 3:
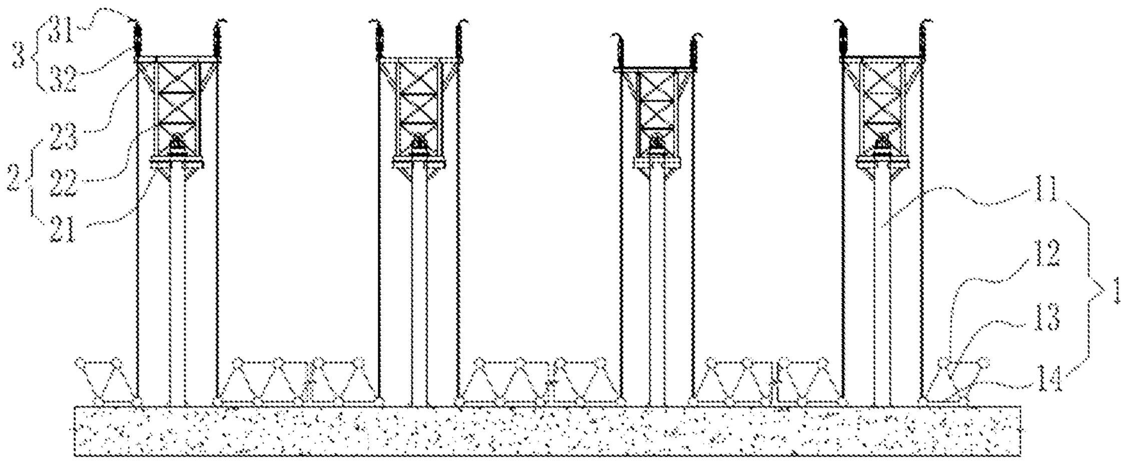
FIG. 3 is a structural schematic diagram of the step S3 of the method for entire removal of a space truss provided in the embodiments of the present invention.
Figure 4:
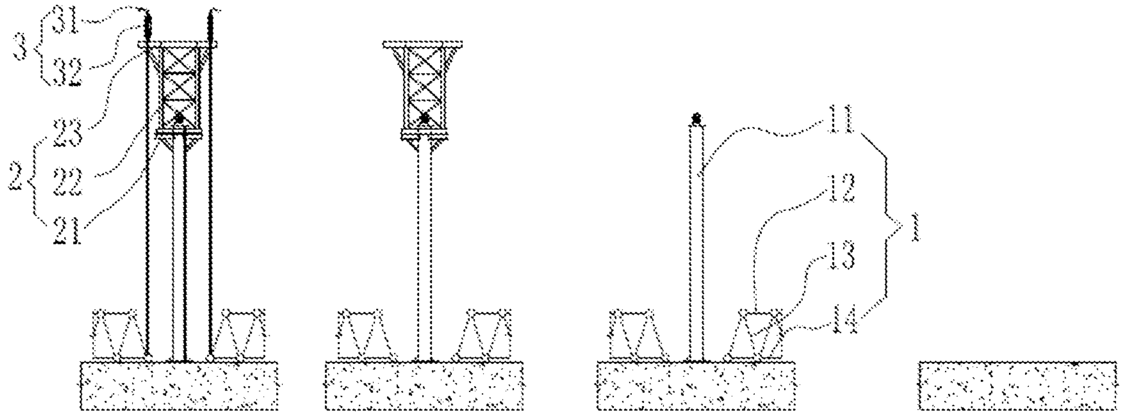
FIG. 4 is a structural schematic diagram of the step S4 of the method for entire removal of a space truss provided in the embodiments of the present invention.
Figure 5:
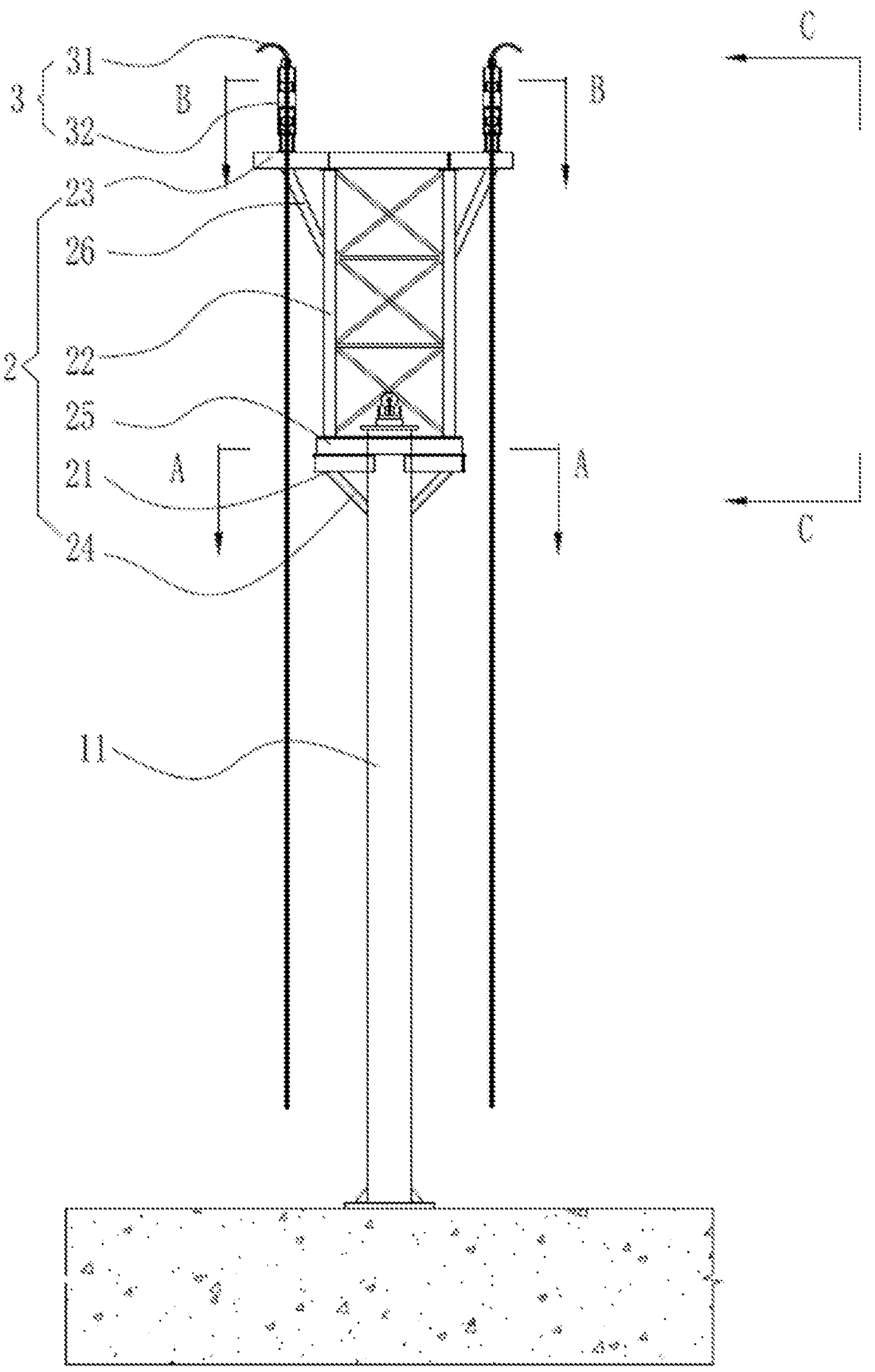
FIG. 5 is a front structural schematic diagram of the assistive support mechanism provided in the embodiments of the present invention.

Furthermore, referring to FIG. 3 to FIG. 5, as a specific embodiment of the assistive support mechanism provided in the present invention, at least two lifting members 32 and at least two stranded wires 31 are provided, and the lifting members 32 and the stranded wires 31 are respectively arranged on both sides of the top of the conversion platform 23. Specifically, the stranded wires 31 are used for being directly fixedly connected to the truss structure 1, and the lifting members 32 are used for driving the stranded wires 31 to move up and down and thus driving the truss structure 1 to move up and down, and in order to ensure the hoisting stability of the entire truss structure 1, multiple stranded wires 31 and multiple lifting members 32 are needed to support the truss structure 1 together. Wherein, initial removal of the part of the truss structure 1 on one side of the assistive support assembly 2 may be performed, at this time, the remaining part of the truss structure 1 to be removed are stably supported on both ends by stranded wires 31 and lifting members 32, so that the stability of the whole operation process can be ensured. Of course, according to actual circumstances and specific demands, in other embodiments of the present invention, there may be four stranded wires 31 and four lifting members 32 respectively arranged on four corners of the conversion platform 23, which is not limited to a single situation herein.

Furthermore, referring to FIG. 1 to FIG. 5, as a specific embodiment of the assistive support mechanism provided in the present invention, the assistive support assembly 2 further comprises at least two first oblique brace struts 24, with one end of each first oblique brace strut 24 fixed on the vertical support rod 11, and the other end of each first oblique brace strut 24 fixed on a bottom of the support platform 21. Specifically, the support platform 21 is mainly made of H-shaped steel connected to a vertical support rod 11 of the original structure, and by providing the first oblique brace struts 24 that are obliquely arranged between the vertical support rod 11 and the support platform 21, the stability of the support platform 21 can be further ensured. Wherein, there may be multiple first oblique brace struts 24 surrounding the vertical support rod 11.

Figure 6:
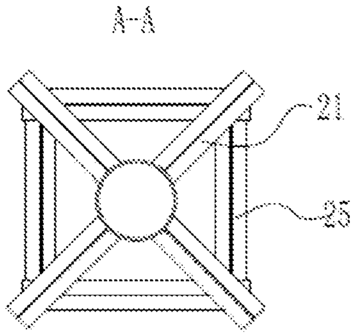
FIG. 6 is a sectional structural view taken along the line A-A in FIG. 5.
Figure 7:
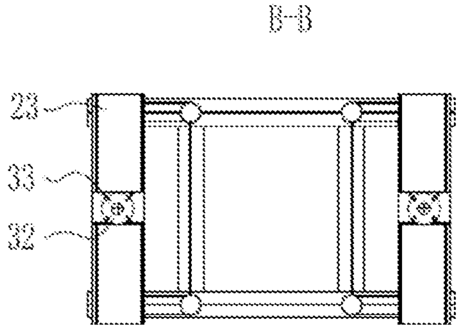
FIG. 7 is a sectional structural view taken along the line B-B in FIG. 5.

Furthermore, referring to FIG. 6 and FIG. 7, as a specific embodiment of the assistive support mechanism provided in the present invention, a conversion seat beam 25 is further arranged between the support platform 21 and the lattice support member 22, and the conversion seat beam 25 has a frame shape. Specifically, the conversion seat beam 25 is a frame made of H-shaped steel bars, and the conversion seat beam 25 is welded to the support platform 21, wherein, the support platform 21 comprises two struts arranged to intersect each other, the conversion seat beam 25 comprises four struts enclosing a frame, and the conversion seat beam 25 is welded on the upper surface of the support platform 21, so that the support platform 21 and the conversion seat beam 25 are combined to form a complete stable support plane.

Furthermore, referring to FIG. 1 to FIG. 4, as a specific embodiment of the assistive support mechanism provided in the present invention, the assistive support assembly 2 further comprises at least two second oblique brace struts 26, with one end of each second oblique brace strut 26 fixed on the lattice support member 22, and the other end of each second oblique brace 26 strut fixed on a bottom of the conversion platform 23. Specifically, the conversion platform 23 forms a complete plane, the lattice support member 22 is arranged under a bottom of the conversion platform 23, and the bottom of the conversion platform 23 is welded to the lattice support member 22, and by providing the second oblique brace struts 26 that are obliquely arranged between the lattice support member 22 and the conversion platform 23, the stability of the conversion platform 23 can be further ensured. Wherein, there may be multiple second oblique brace struts 26 surrounding the lattice support member 22.

Furthermore, referring to FIG. 5, as a specific embodiment of the assistive support mechanism provided in the present invention, a fastening platen 33 is fixed at a bottom of the lifting member 32. Specifically, the lifting member 32 generally adopts a hydraulic jack that may drive the stranded wire 31 to move up and down, the hydraulic jack has a pedestal on its bottom, and fastening platens 33 are arranged upon four corners of the pedestal, with one end of each fastening platen 33 directly fixed on the conversion platform 23 and the other end thereof fixed upon the pedestal. Of course, according to actual circumstances and specific demands, in other embodiments of the present invention, the bottom of the lifting member 32 may be directly welded on the conversion platform 23, which is not limited to a single situation herein.

Referring to FIG. 2 to FIG. 4, the present invention also provides a method for entire removal of a space truss, the method for entire removal of a space truss comprises the following steps:

S2, mounting the assistive support mechanism of any one of the afore-mentioned embodiments on a vertical support rod 11 of each of a plurality of truss structures 1, wherein the stranded wire 31 is in fixed connection with a corresponding truss structure 1;

S3, cutting off connection rods of the truss structure 1 surrounding the vertical support rod 11, separating the truss structure 1 from the vertical support rod 11, and lowering the truss structure 1 to the ground by the lifting assembly 3;

S4, removing the truss structure 1 and the assistive support mechanism on the ground.

With respect to the method for entire removal of a space truss provided in the present invention, the assistive support mechanism is directly arranged on an original vertical support rod 11, which is obtainable by retrofitting an original structure, the support platform 21 can support the lattice support member 22, the lattice support member 22 can raise the height of the entire mechanism, the conversion platform 23 is used to support the lifting assembly 3, the stranded wire 31 fixes the truss structure 1, and then, initial removal of the truss structure 1 can be performed at a high altitude to separate the truss structure 1 from the vertical support rod 11, the lifting member 32 can drive the stranded wire 31 to move up and down so as to steadily lower the remaining truss structure 1 to the ground, while the control member can control the lifting member 32, and after the truss structure 1 is lowered to the ground, secondary removal is performed on the entire body thereof, hence, the major removal work is done on the ground, thereby reducing the requirement for removal-assisting measures, improving the working efficiency and reducing the operational risks.

Specifically, when the lifting assembly 3 lowers the truss structure 1 to the height of the ground, all the lifting members 32 thereof are connected to a common control member by cables, and the control member is generally a computer, the computer controls all the lifting members 32 to carry out the lowering operation in synchronization, and the computer can display the real-time force-bearing condition of each lifting member, while the lowering of a single lifting member thereof can be actuated at an operating console to ensure the synchronism of the operation.

Figure 8:
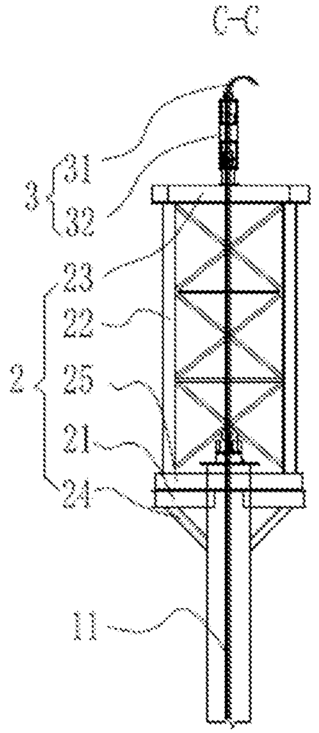
FIG. 8 is a side view taken from the line C-C in FIG. 5.

Furthermore, referring to FIG. 5 and FIG. 8, as a specific embodiment of the method for entire removal of a space truss provided in the present invention, the stranded wire 31 is fixedly connected to a lower chord member 14 of the truss structure 1. Specifically, the truss structure 1 comprises an upper chord member 12, a web member, and a lower chord member 14, wherein the web member is obliquely arranged between the upper chord member 12 and the lower chord member 14, and the stranded wire 31 is directly fixed to the lower chord member 14, so that the truss structure 1 is supported and fixed from the bottom thereof, thereby ensuring the overall stability. Of course, according to actual circumstances and specific demands, in other embodiments of the present invention, the stranded wire 31 may also be fixedly connected to an upper chord member 12, which is not limited to a single situation herein.

Furthermore, as a specific embodiment of the method for entire removal of a space truss provided in the present invention, before mounting the assistive support mechanism, the method further comprises the following step: S1, performing construction simulation calculation on the truss structure 1 prior to removal. Specifically, the construction simulation calculation is carried out prior to removal, and the results of the simulation calculation are used to determine a mounting position of the assistive support mechanism and determine the specific removal positions and methods, so that a removal plan can be determined at an early stage to simulate the removal process, thereby preventing the problems that the difficulty level for controlling the stability of the truss structure 1 during the operation process is high, the force-bearing conditions during the removal process is not clear enough, and thus the safety is difficulty to ensure.

Furthermore, as a specific embodiment of the method for entire removal of a space truss provided in the present invention, the truss structure 1 is removed by sequentially removing an upper chord member 12, a middle web member 13, a welding ball of the upper chord member 12, a lower chord member 14 and a welding ball of the lower chord member 14. Specifically, in the process of secondary removal, the entire truss structure 1 has already been lowered onto the ground, and by performing the removal sequentially in a top-down manner, the integrity of each strut of the upper chord member 12, the middle web member 13 and the lower chord member 14 can be ensured during the removal process, with a high safety level. The assistive support mechanism also needs to be removed, and its removal is also in a top-down manner by sequentially removing the lifting assembly 3, the assistive support assembly 2 and the vertical support rod 11.

Apparently, the afore-mentioned embodiments are merely examples illustrated for clearly describing the present invention, rather than limiting the implementation ways thereof. For a person skilled in the art, various changes and modifications in other different forms can be made based on the afore-mentioned description. It is unnecessary and impossible to exhaustively list all the implementation ways herein. However, any obvious changes or modifications derived from the afore-mentioned description are intended to be embraced within the protection scope of the present invention.

The invention claimed is:

1. An assistive support mechanism, arranged on a vertical support rod of a truss structure, wherein, the assistive support mechanism comprises:

an assistive support assembly having a support platform, a lattice support member arranged on the support platform, and a conversion platform arranged at a top of the lattice support member; and a lifting assembly, arranged at a top of the conversion platform and comprising a stranded wire for fixing the truss structure, a lifting member for driving the stranded wire to move up and down, and a control member for controlling the lifting member;

wherein a conversion seat beam having a frame shape is further arranged between the support platform and the lattice support member.

2. The assistive support mechanism of claim 1, wherein at least two lifting members and at least two stranded wires are provided, and the lifting members and the stranded wires are respectively arranged on both sides of the top of the conversion platform.

3. The assistive support mechanism of claim 1, wherein the assistive support assembly further comprises at least two first oblique brace struts, with a first end of each first oblique brace strut fixed on the vertical support rod, and a second end of each first oblique brace strut fixed on a bottom of the support platform.

4. The assistive support mechanism of claim 1, wherein the assistive support assembly further comprises at least two second oblique brace struts, with a first end of each second oblique brace strut fixed on the lattice support member, and a second end of each second oblique brace strut fixed on a bottom of the conversion platform.

5. The assistive support mechanism of claim 1, characterized in that a fastening platen is fixed at a bottom of the lifting member.

6. A method for entire removal of a space truss, comprising the following steps:

mounting the assistive support mechanism of claim 1 on a vertical support rod of each of a plurality of truss structures, wherein the stranded wire is in fixed connection with a corresponding truss structure;

cutting off connection rods of the truss structure surrounding the vertical support rod, separating the truss structure from the vertical support rod, and lowering the truss structure to the ground by the lifting assembly;

removing the truss structure and the assistive support mechanism on the ground.

7. The method of claim 6, wherein the stranded wire is fixedly connected to a lower chord member of the truss structure.

8. The method of claim 6, further comprising the following step before mounting the assistive support mechanism:

performing construction simulation calculation on the truss structure prior to removal.

9. The method of claim 6, wherein the truss structure is removed by sequentially removing an upper chord member, a middle web member, a welding ball of the upper chord member, a lower chord member and a welding ball of the lower chord member.

* * * * *